United States Patent
Dyer

[11] 3,732,632
[45] May 15, 1973

[54] TEACHING AID

[76] Inventor: Charles A. Dyer, 711 Amsterdam Avenue, Apt. 16-I, New York, N.Y. 10025

[22] Filed: June 18, 1971

[21] Appl. No.: 154,427

[52] U.S. Cl.................................35/31 A, 235/88
[51] Int. Cl.............................................G09b 19/02
[58] Field of Search........................35/31 A, 74; 40/70 R; 235/78, 83, 88, 116, 122

[56] References Cited

UNITED STATES PATENTS

| | | | |
|---|---|---|---|
| 1,539,868 | 6/1925 | Roberts | 40/70 R |
| 1,836,643 | 12/1931 | Chesham | 35/74 |

*Primary Examiner*—Wm. H. Grieb
*Attorney*—Polachek, Saulsbury and Hough

[57] ABSTRACT

A teaching aid mathematical calculator for adding, subtracting, multiplying, dividing, illustrating specific numbers divisible by a divisor, illustrating the remainder after division by any particular divisor, and in more complicated embodiments, being set up for logarithmic or other relationships, the teaching aid typically and in one preferred embodiment including at least three separate sheets, the first two of which include slits from an outer edge to about at least their central portions, the two slit sheets being fitted together so that a wall of one extends through the slit of the other and vice versa, preferably with the slits at right angles to one another, and with a dial slide extending at least through an upper surface of one of the inserted sheets, with the third sheet being preferably in the form of a disk having a slit extending from about its center outwardly radially through the outer edge thereof, and being insertable between the first two sheets at a slit point of one of the sheets so as to be rotatable between the two sheets by manipulation of a dial system of apertures in the third sheet positioned to correspond to the rotary slot in at least one of the first two sheets, preferably the rotary slot extending through both of the first and second sheets, with numbers arranged in some mathematical relationship extending around the dial position and for each base number so located around the dial position additional numbers extending radially outwardly therefrom in accord with some mathematical relationship to the base number, and also the third disk sheet having also base numbers extending in some mathematical relationship around the dial position as base numbers, with additional numbers such as multiples thereof extending radially outward from each base number of the third sheet, such that by dialing specific numbers toward and to a zero point, for example, the numbers may be added, for example.

5 Claims, 9 Drawing Figures

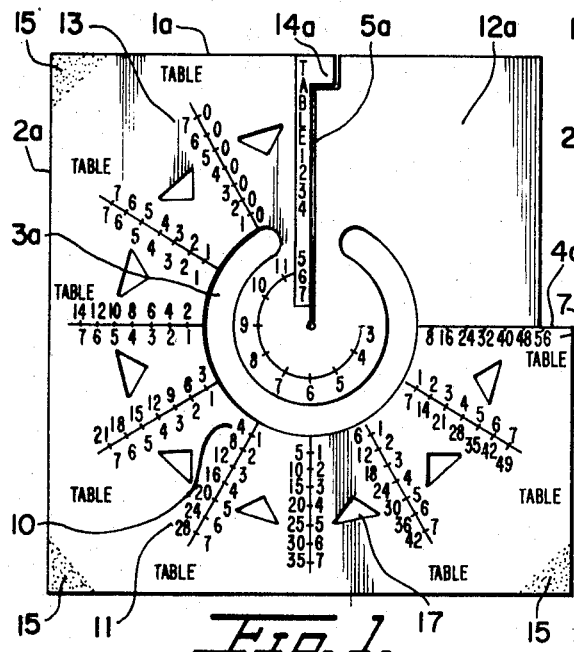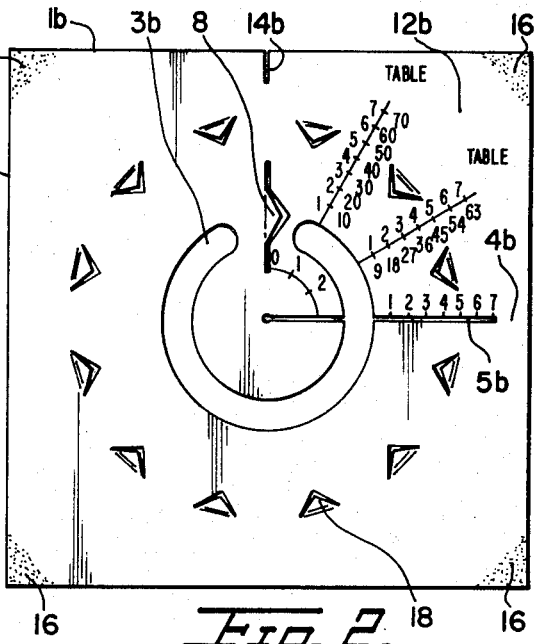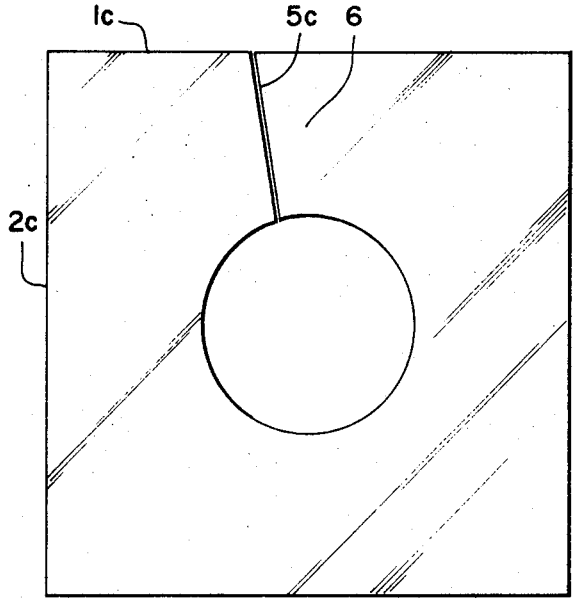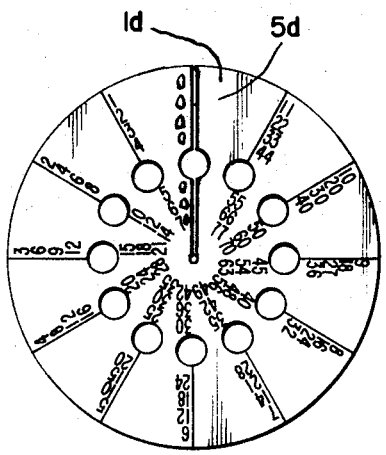

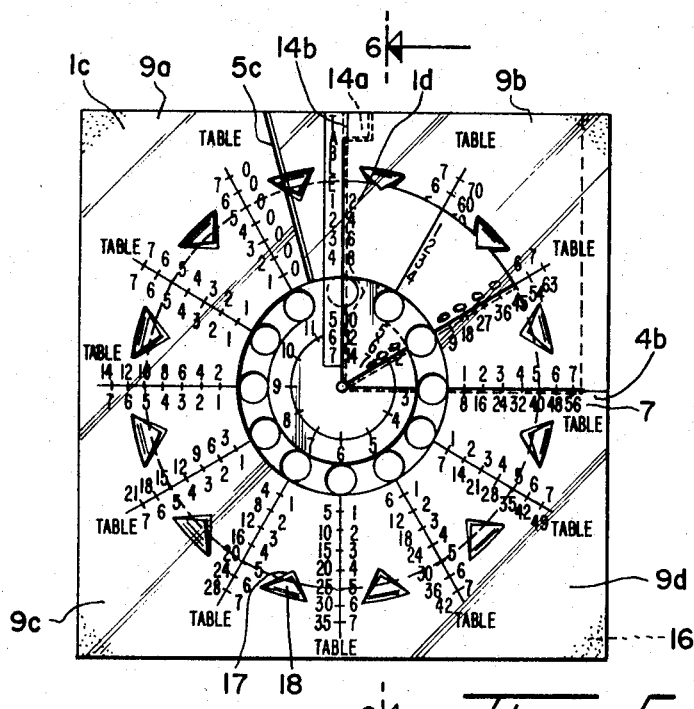
Fig. 5.
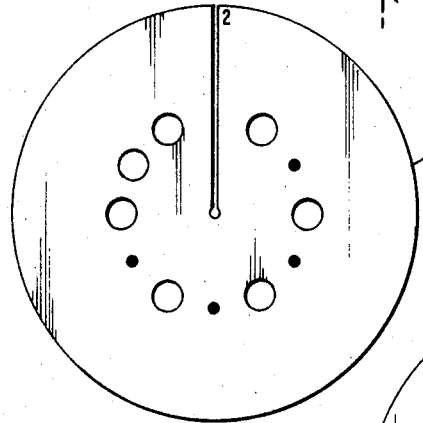
Fig. 7.
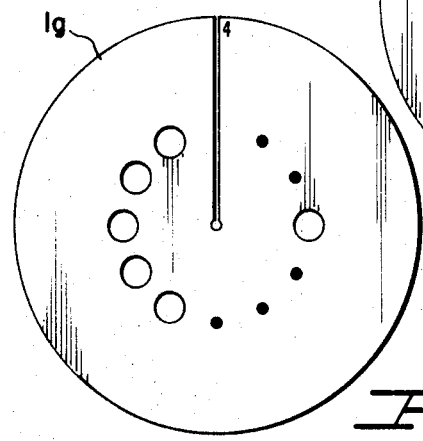
Fig. 8.
Fig. 9.
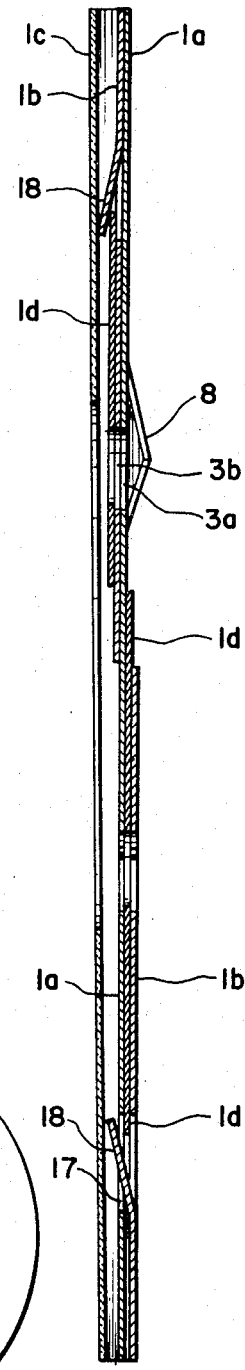
Fig. 6.
INVENTOR.
CHARLES A. DYER
BY Polachek, Saulsbury + Hough
ATTORNEYS.

TEACHING AID

This invention relates to a teaching aid for illustrating mathematical relationships but the form thereof being adaptable to interrelated data to be illustrated graphically.

BACKGROUND

Prior to this invention, there has not been any suitable teaching aid of the character of this invention. Additionally however, not only is the invention directed to a comparing of data in order to gain some additional information therefrom and/or to better understand a particular relationship of data being dealt with, but as compared to the lack of prior art methods of construction of inexpensive workable combinations of card systems such as herein disclosed and illustrated, particularly where one card must move relative to another surface, this invention is directed to such systems.

SUMMARY OF THE INVENTION

Objects of this invention include the dealing with and overcoming of one or more problems discussed above, as well as other objects which become apparent from the preceding and following disclosure, together with new and unforeseen advantages resulting from the invention described herein.

One or more of the preceding objects are obtained by the invention as described hereafter.

The various types of data that may be illustrated on the structured and combined sheets of this invention are almost unlimited. This is readily recognized by any person associated with graphics and with mathematical relationships. Although the invention may be utilized as a calculator in the nature of logarithms, or merely simple arithmetic, such as adding, subtracting, dividing, multiplying, determining remainders for any particular quantity divided by a divisor, it is believed that a primary utility of this invention is its use as a teaching aid. It is necessary that at least three sheets be used in combination, and in determining remainders after division by a specified divisor, a fourth sheet also is used in the combination, for example, in one embodiment. In a typical embodiment, the first and second sheets are fit together so that the slits are at right angles, preferably to each other and such that the dialing slots are superimposed one upon the other i.e., coincident one with the other, whereby about one-fourth of the lower sheet is extended above the surface of the upper sheet and the numbers are carried on the exposed three-fourths of the upper sheet and upon the exposed one-fourth of the sheet extending from the slits. With numbers on the surfaces of the exposed face(s) of the sheets as combined, the numbers extend typically counterclockwise from zero up to 10 as base numbers, and extending out from each base number are the multiples of that base number with each additional multiple comprising a separate table, i.e., table 1, table 2, table 3, for example. Similarly on the third sheet disk card fittable into and rotatable around the slit vertex point of the first two sheets as fitted together, the disk sheet has numbers extending in consecutive series, for example, in the same direction such as counterclockwise up to 10 or 11, with multiples thereof extending radially inwardly (or radially outwardly) as the first, second, and third tables for examples. A fourth sheet also in a disk form preferably, is of larger diameter than the disk of the third sheet so that it may be viewed as extending from behind the third disk sheet, the fourth disk sheet being insertable and rotatable behind the third disk sheet, with the fourth disk sheet having dial positioned apertures located such as to indicate the remainder still existing on the third sheet when the fourth sheet (together with the third sheet) has been reverse dialed back to the zero position for the fourth sheet (if there by any remainder, the third sheet not being thereby dialed back to the zero position).

THE FIGURES

FIGS. 1 through 4 and 7 through 9 illustrates plan views of specific components of the present invention with the components (elements) separately illustrated in the disassembled state.

FIG. 5 illustrates a plan view of the elements of FIGS. 1 through 4 when assembled.

FIG. 1 in particular is an elevation plan view of a first sheet, about three-fourths of which will have its face exposed and accordingly has the designated numerals properly spaced thereon around the dial position of the slot.

FIG. 2 illustrates an elevation plan view of a second sheet a majority of which will constitute the back sheet but about one-fourth of which when slipped through the slit in the first sheet will be exposed as the upper face on which numerals or other data are recorded as illustrated.

FIG. 3 illustrates an elevation plan view of a transparent sheet preferably slit at about the location illustrated such that the flap 6 may be folded back allowing insertion of the disk of FIG. 4 into the slit of FIG. 1 sheet at point 5a.

FIG. 5 illustrates the appearance of the sheets of FIGS. 1 to 4 when combined, in an elevation plan view thereof. In a cutaway portion, the overlap portion 7 may be seen as overlapping the sheet portion 4b. Because the transparent plastic sheet of FIG. 3 is on top, the plastic sheet 1c is illustrated as the top sheet in FIG. 5.

FIG. 6 illustrates a cross-sectional view of the embodiment of FIG. 5 as taken along lines 6—6.

For each of the FIGS. 7, 8 and 9, three separate disks are illustrated for modulus 2,3 and 4, the modulus 2 illustrating the dial-position apertures as are necessary for that particular modulus, and similarly for the FIGS. 7 and 8, the dial-position apertures are illustrated.

DETAILED DESCRIPTION OF THE INVENTION

In a variation embodiment, in addition to the elements of FIGS. 1,2 and 4, there is required at least on of the elements of FIGS. 7,8 or 9.

In FIG. 1, there is disclosed a first sheet typically made of either plastic or of hardboard, slick cardboard or plastic preferably being employed to facilitate the operation of the entire mechanism, includes the edge 1a which in this particular embodiment will represent the top of the chart, edge 2a identified in order to better understand how the sheet of FIG. 1 is combined with the sheet of FIG. 2, 3a identifying the dial space aperture having a series of base numbers 10 such as the number four as a part of the series ranging from zero to eight as illustrated on the card of FIG. 1, which series continues on the sheet or card of FIG. 2 up to numeral 10 and on the respective cards of FIGS. 1 and 2 for each base number there being a series of other numbers 11 which are multiples of the base number, such as the multiples of 4 being 8, 12, and the like. In further reference to FIG. 1, to an edge, the slit being identified as 5a. Additionally, preferably there is the minor off-set step 4a extending from the edge and the step including at the end thereof an upwardly-directed edge about parallel with the edge from which the step extends, also the small portion 7 is defined which facilitates the uniting of the card of FIG. 1 with the card of FIG. 2, together with locking flap 14a and slit 14b.

FIG. 2 is of a shape more or less the same as that of FIG. 1 except that the slit 5b which may or may not extend all the way through the edge preferably does not extend through the edge but merely extends up to a point close to the edge and includes a slit portion at about right angles to he edge but extending in a different (opposite) direction from that of the card of FIG. 1 of the step 4a, such that the area 4b is easily and securely engageable with the step 4a. It should be noted that the edge 1b of the sheet or card of FIG. 2 represents the top of the card relative to the position with the sheet or card of FIG. 1, and that they are combined in such a manner that these edges coincide. More particularly the portion is inserted through the slot 5b such that the portion 12a is beneath the portion 12b and such that the slot-space 3b coincides with the slot space 3a.

The sheet of FIG. 3 is representative of a transparent sheet having a hole in the middle corresponding to the outer diameter of the dial-space aperture 3a and it may have a flap 6 which may be turned backwards for the insertion of a rotatable card into the slit 5a when the sheet of FIG. 1 is combined with the sheet of FIG. 2 and such that the flap 6 slips back into its position adjacent the slot 5c after the insertion of the card into the slot 5a. Adhesive coating at points 15 and 16 is optional.

FIG. 4 illustrates the third essential element, i.e., preferably a rotary disk, having specific dial holes therein corresponding to numbers listed serially around in the same counterclockwise direction as found on the sheets 1 and 2 (i.e., a common direction), with a slot 5d extending from the central portion through the edge. The portion 1d is insertable into the slot 5a when sheets of FIGS. 1 and 2 are combined whereby the rotary disk of FIG. 4 is slidable between the sheets of FIGS. 1 and 2 with the sole viewable portion being the portions through the slots and the portion of the disk which remains extending from the slot 5a at any time in particular. In a preferred embodiment a minor portion of the card disclosing the zeroes is always viewable slightly to the right of the slot 5a are the portions of the card within the slot between the sheets unless it has been dialed to a particular position in operation of the mechanism. The sheet of FIG. 2 includes a cut portion approximately as shown in FIG. 2 at projection 8 which is pressed downwardly slightly such that when the card of FIG. 4 is rotated to almost a 360° amount between the two sheets, the portion 1d along the slot edge 5d becomes engaged with the projection 8 preventing the rotary sheet of FIG. 4 from further insertion.

FIG. 5 illustrates the sheets of FIGS. 1, 2, 3 and 4 as combined. Preferably in positions of about 9a, 9b, 9c and 9d there would be brads or staples or equivalents connecting means connecting the sheets of FIGS. 1,2 and 3 together firmly. It may be seen in the breakaway portion of the transparent cover 1c that beneath that cover on the right hand edge of the figure as shown there is the area 4b of the sheet of FIG. 2 locked with the portion 7 of the sheet of FIG. 1.

With regard to FIG. 6, in the cross sectional view as taken along line 6—6 of FIG. 5 it is more easily understandable the working mechanism in relationship of the various sheets and disks by making reference to the sheets as numbered and as overlapping one another in the embodiment of FIG. 5. It will be noted for example that the sheet 1a as for example seen in FIG. 1 overlies the sheet 1b at the point of the cross-sectional view along line 6—6 of FIG. 5, and in this embodiment the sheet 1b is illustrated as having the downwardly turned tab 18 into which rides the sheet 1d of FIG. 4, with the sheet 1b being between the sheet 1d and the sheet 1a, while also there is viewable the upwardly turned tab 8 and the slot 3a and 3b of sheets 1a and 2b of FIGS. 1 and 2 respectively. Similarly it is seen how the sheet 1b at a lower central point along the view of line 6—6 is extending between the sheets 1a and 1b and the sheet 1b having the inwardly turned flap 18 at the lower portion of the figure. In like manner the backing portion 1c is viewable.

Each of FIGS. 7, 8 and 9 represent additional cards which would be separately insertable behind the rotary disk card of FIG. 4 to be used in conjunction therewith in order to determine for any specific given number existing on the face of the dial as shown in FIG. 5, the remainder after such number has been divided by the modulus number indicated on disk of FIG. 7 such as modulus number 2, the disk of FIG. 9 such as the modulus number 4, or the FIG. 8 such as the modulus number 3.

The guide holes (apertures) 17 and guide flaps 18 are preferred but optional.

In addition to uses mentioned above, the calculator may be adapted to trigonometry, geometry, calculus, etc.. For simple consecutive dialings, a spelling teaching aid may have letters to be dialed which upon completion of dialing discloses the word spelled if correctly dialed.

Several schemes can be used to describe and analyze the interaction of the parts of this device. We may think of the device as a strictly finite automaton, for instance, where the functions of control unit, reading head, tape input, and the rule for moving the tape are fulfilled respectively by the rotating elements containing holes and slots, the slot or slots in the cover component which determines what holes can be accessed, the scale settings on the radial cuts or circular edges of the components, and the sequence and direction of movement of the holes within the cover slot. The device contains a finite number of parts which can be arranged a finite number of ways (yielding corresponding interval states of the automaton). It senses or generates one symbol (set of scale values) at a time, and proceeds from an initial state until it either reaches that state again or blocks, i.e., cannot accept (or generate) any more symbols. I conceive of the set of successive scale settings generated by this device in all the cases where it returns to its initial state as a kind of language, where the scale settings are the symbols which make up the language. This would allow us to employ the methods of mathematical linguistics as a vehicle for investigating the possible applications of this device to concrete problems, and for designing programs to solve these problems.

In designing the components of this device, I can use a linear graph interpretation of the transitions which should exist between the various states of the device. Such a graph would be a directed graph, where the vertices represent states and the directed edges represent input values. Each state of the device could of course be represented by an n-tuple, S $[s_a, s_b, \ldots, s_n]$ where the elements $s_a, \ldots s_n$ (scale values on the device) can be expressed in as many different units or dimensions as desired. I can also define matrices which describe the transformations between n-tuples in successive states in certain applications (where for instance the n-tuples in question could be interpreted as a basis for a vector space) and use matrix algebra techniques to explore the properties of the specific application.

A tree type graph structure is also used for planning the action of the device in terms of the change ($\Delta$) occurring in each component at the end of each cycle of the device. $\Delta$ is defined as the distance from a hole or the "front" end of a slot to the end of the cover slot, which limits its movement. It is the amount of change a hole or slot can produce in its disc scale reading. The tree structure makes obvious the fact that each successive level of disc component has a reading or is capable of an amount of change which depends on the reading or the amount of change of the level or levels which came before it. The general principles involved in this approach are:

a. Each cycle of the device is characterized by a change $\Delta$ on each level.

b. This change ($\Delta$) can be zero in some cases.

c. For any given level to change, the following conditions must be satisfied:

change in disk $\leq$ change in mask change in level $n$ $\leq$ change in level $n-1$ The steps in planning are to:

1. Establish a threshold or limit for $\Delta$ for each level by referring to the size of the mask opening and $\Delta$ for the previous level.

2. Assign the successive values desired for $\Delta$ for that particular level or dimension for the problem at hand.

This device is of practical use in industrial education or in public school classroom teaching, where it can be employed as a means of systematically referencing an organized collection of materials assembled in the classroom and identifying the components to be used in creating sets of graded lessons. Any one or more of these uses requires no extended period of specialized training for those who are to use or assemble the necessary work materials, and make it possible for the teachers and students who will actually use the materials to become directly involved in their creation. It can be used to provide many of the features of programmed instruction or computer assisted instruction at a fraction of the present cost of such instruction.

OPERATION

As a specific example of the operation of a disk having a mathematical dial system of the type illustrated in FIGS. 1 through 9, the operation is as follows.

For addition, a finger or pencil is placed in the hole at dial-position number 2 and dialed in a clockwise direction to the zero position whereby on the sheet of FIG. 4 there will appear the series 1 base digit 2 slightly to the right of the slot 5; thereafter if the 2 is to have added to it the digit 4, the dialing finger or pencil is placed into the dial aperture adjacent the 4 and is dialed to zero whereby the number appearing at the table 1 series level will indicate the sum of the 2 and the 4 i.e., will be a number 6.

If the calculator is to be used for subtraction, you first dial in a clockwise direction the larger number from which the smaller number is to be subtracted and thereafter dial in a counterclockwise direction from the zero point up to the number that is to be subtracted whereby the number showing on the card of FIG. 4 slightly to the right of the slot 5a will be the remainder.

In each of the preceding examples, where either addition or subtraction is conducted, the answer may also be indicated on a central dial as is illustrated in the present FIGS. 1,2 and 5, in that the card will be extruded from the slit 5a sufficiently to cover the numbers starting from zero ranging upwardly which are not the answer and the first visible number not covered by the card will be the answer. For example, in the first example, the answer of the sum of 2 and 4 was 6, whereby the digits 1 through 5 would be covered and the slot of edge 1d would be adjacent the 6 position.

For division, for any particular divisor as shown on the central dial, any divisor ranging from 1 through 11 — and such numbers may be divided in order to indicate multiples thereof on the face 10 — may be illustrated as an even divisor (no remainder) into the numbers disclosed on the card of FIG. 4 when the dial has been dialed to any particular digit position such as the 3 would carry the card around to cover positions 1 to and adjacent the 3 as the divisor and to the left of the disclosed multiples of numbers quotient is the corresponding table number. For example, if the card is dialed to position 3, there is disclosed to the right of slot 5a the base number 3 which if divided by the 3 gives you the number 1 shown on the table as series 1, or alternatively the multiple of 3 i.e., the 6 divided by the divisor 3 will give you the quotient 2 as shown as the table series 2 quotient. Alternatively the divisor 3 into the number 9 as shown to the right of the slot will go three times as shown by the adjacent number or digit 3 on the table to the left of the slot.

As an example of the employment of any one of the cards of FIGS. 7, 8, and 9, typically the card of FIG. 8 which is for modulus 3 may be inserted behind the rotary card of FIG. 4. When inserted if the number 10 were dialed, and thereafter were reversely dialed in a counterclockwise direction by the amount of the modulus 3 for as many multiples thereof as is necessary to dial the modulus card identified as card 3 back to its zero position, at that zero position the card of FIG. 4 still having a portion of the 1d edge of the card exposed outside of the slot 5a and the maximum number as counted in counterclockwise direction as well as is indicated on the central dial would be the remainder, in this case the remainder being indicated as 1. Restated, you dial 10 in a clockwise direction to the zero position carrying with it both the cards of FIG. 4 and of FIG. 8 as are carried whenever the finger or pencil slips into common holes to cause both cards to be carried in a clockwise direction up until the time that the finger or pencil or the like has reached the zero position; thereafter from the zero position the dial extending through all holes is dialed back to the 3 position three consecutive times at which point the card of the FIG. 8 will have reached the point at which it is fully inserted again, and at which point the card of FIG. 4 will remain exposed to the extent of indicating 1 as the remainder when 10 is divided by divisor 3.

There are many other applications as previously discussed above to which this invention may be equally suitably and well applied as is apparent to a person of ordinary skill in mathematical and graphical arts, as well as the fact that there are many shapes that the present cards may take other than those illustrated without departing from the spirit or scope of the invention. Accordingly, it is within the scope of the present invention to make various modifications and substitutions of equivalents as would be apparent to a person having this ordinary skill in this art. Accordingly, it should be recognized that the preceding disclosure and illustrated drawings are intended solely to make possible a more clear understanding of the invention as a whole for a particular example of its application and accordingly is not intended to limit unduly the scope of the invention.

I claim:

1. A teaching aid comprising in combination: a first at least semi-rigid sheet having a first slit extending from about one border edge toward a first vertex point about central of the sheet; a second sheet having a second slit extending from about a border edge thereof toward a second vertex point about central of the sheet; one of said first and second sheets being superimposed on the other with one of said first vertex point and said second vertex point superimposed one over the other with said first slit superimposed over a part of said second sheet and with said second slit superimposed over a part of said first sheet, each of said sheets having a part thereof extending through the slit of the other sheet, at least a third sheet having a third slit extending through an edge thereof from about a third vertex point of rotation at about a central point of said third sheet, said third sheet being located and rotatably Slidable through and past at least one of said first and second slits and between said first and second sheets, at least one of said first and second sheets having annular slot-space partially circumscribing its respective vertex point, and said third sheet having handle means exposed through said slot-space such that said third sheet may be rotatably slid by said handle means, in which on an exposed base of at least one of said first and second sheets are a series of first markings spaced along a circumferential perimeter of the sheet's respective annular slot-space, and on said third sheet's base are a series of second markings spaced such as to have a predetermined relationship to said first markings, and such that when said third sheet is rotated by said handle means, at least one of said second markings becomes viewable as said third sheet is rotated past one of said slits from between said first and second sheets, in which said first and second markings are mathematical symbols, in which said predetermined relationship is mathematical, and in which said second markings as they become viewable by rotary motion of said third sheet bear a specific mathematical relationship to said first marking, in which for each of said first and second series of markings, each series comprises consecutive base numbers from zero upward, and for each base number there is extending radially a list of multiples of said each base number, and in which each of said first and second series of markings are arranged in common on direction of clockwise and counter clockwise directions.

2. A teaching aid according to claim 1, in which said third series of markings are arranged in a direction opposite to said common direction.

3. A teaching aid according to claim 2, in which said annular disks handle means comprises a series of separate dial-position apertures corresponding to said first markings' series.

4. A teaching aid according to claim 3, in which said first and second slits are at angles of about 90° to each other with said first sheet extending through said second slit up to about said 90°, each of said sheets having said annular slot-space partially circumscribing its respective vertex point with the slot-space coincident with each other, in which said third sheet is a first annular disk, and said teaching aid further including a second series of third markings spaced along an inner perimeter of said exposed face along a circumferential perimeter of the respective annular space on a side of said sheets annular space opposite from said first markings.

5. A teaching aid according to claim 2, including a second rotatable annular disk insertable between said first and second sheets behind said first annular disk, said second annular disk having dial-position apertures corresponding to a zero-position aperture plus serially consecutive apertures equal to a predetermined devisor, after which dial-position apertures occur at a serially consecutive spacing equal to said predetermined devisor, such that when a predetermined base series number has been dialed to the zero dial position, thereafter by consecutive reverse dialings in dial spacings equal to said predetermined devisor the remaining exposed base numbers when said fourth disk has been return-dialed to zero position is the modulus remainder for that predetermined base series number relative to the predetermined devisor.

* * * * *